United States Patent
Rao et al.

(10) Patent No.: US 12,373,091 B1
(45) Date of Patent: Jul. 29, 2025

(54) SYSTEM AND METHOD FOR INTELLIGENT MULTI-MODAL INTERACTIONS IN MERCHANDISE AND ASSORTMENT PLANNING

(71) Applicant: Blue Yonder Group, Inc., Scottsdale, AZ (US)

(72) Inventors: Machiraju Pakasasana Rama Rao, Hyderabad (IN); Arun Raj Parwana Adiraju, Hyderabad (IN); Pawan Kumar Singh, Hyderabad (IN); Abhinav Kishore, Hyderabad (IN); Vineet Chaudhary, Hyderabad (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 16/377,998

(22) Filed: Apr. 8, 2019

Related U.S. Application Data

(60) Provisional application No. 62/678,671, filed on May 31, 2018.

(51) Int. Cl.
*G06F 3/0487* (2013.01)
*G06Q 10/10* (2023.01)
(Continued)

(52) U.S. Cl.
CPC ............ *G06F 3/0487* (2013.01); *G06Q 10/10* (2013.01); *G06F 3/013* (2013.01); *G06F 3/017* (2013.01);
(Continued)

(58) Field of Classification Search
CPC .... G06F 3/0487; G06F 3/03543; G06F 3/167; G06F 3/017; G06F 3/013; G06F 3/0488; G06F 3/0489; G06Q 10/10
See application file for complete search history.

(56) References Cited

U.S. PATENT DOCUMENTS

| | | | | |
|---|---|---|---|---|
| 5,390,281 | A | * | 2/1995 | Luciw ................ G06F 9/453 706/53 |
| 5,726,688 | A | * | 3/1998 | Siefert ................ G06F 3/0482 715/821 |

(Continued)

OTHER PUBLICATIONS

Rahul Jain, Joy Bose, Tasleem Arif, Contextual adaptive user interface for Android devices, Dec. 13-15, 2013, 5 pages (Year: 2013).*

(Continued)

*Primary Examiner* — Yongjia Pan
(74) *Attorney, Agent, or Firm* — Spencer Fane LLP; Steven J. Laureanti

(57) ABSTRACT

A system and method are disclosed for generating intelligent multi-modal system actions based, at least in part, on predicting a user action and one or more stored user inputs. Embodiments include a database and a computer comprising a processor and memory, the computer is configured to monitor user inputs using one or more sensors and one or more tactile interface devices, detect at least two modes of user input and store the user inputs in the database. The computer is further configured to evaluate the stored user inputs in the database and the at least two modes of user input to generate a system action and generate a system action based, at least in part, on predicting a user action and one or more stored user inputs.

18 Claims, 5 Drawing Sheets

(51) Int. Cl.
  *G06F 3/01* (2006.01)
  *G06F 3/0354* (2013.01)
  *G06F 3/0488* (2022.01)
  *G06F 3/0489* (2022.01)
  *G06F 3/16* (2006.01)

(52) U.S. Cl.
  CPC ........ *G06F 3/03543* (2013.01); *G06F 3/0488* (2013.01); *G06F 3/0489* (2013.01); *G06F 3/167* (2013.01)

(56) References Cited

U.S. PATENT DOCUMENTS

| | | | | |
|---|---|---|---|---|
| 6,021,403 | A * | 2/2000 | Horvitz | G06N 5/00 706/45 |
| 6,421,453 | B1 * | 7/2002 | Kanevsky | G06F 21/316 382/115 |
| 6,567,838 | B1 * | 5/2003 | Korenshtein | G06F 9/451 718/103 |
| 7,409,356 | B1 * | 8/2008 | Geddes | G06Q 10/06315 705/7.11 |
| 7,519,566 | B2 * | 4/2009 | Prigogin | G06Q 10/06 706/21 |
| 7,644,863 | B2 * | 1/2010 | Chen | G06Q 10/06 705/28 |
| 7,679,534 | B2 * | 3/2010 | Kay | G06F 3/0233 341/22 |
| 8,364,612 | B2 * | 1/2013 | Van Gael | G06N 20/00 706/12 |
| 8,650,139 | B2 * | 2/2014 | Jain | G06N 5/022 706/12 |
| 8,843,429 | B2 * | 9/2014 | Wang | G06F 16/3349 706/46 |
| 9,152,221 | B2 * | 10/2015 | Denker | G06F 16/2425 |
| 9,165,280 | B2 * | 10/2015 | Basson | G06Q 10/10 |
| 9,197,716 | B2 * | 11/2015 | Igelka | H04L 67/32 |
| 9,245,225 | B2 * | 1/2016 | Winn | G06F 16/337 |
| 9,391,986 | B2 * | 7/2016 | Schultz | H04L 9/3231 |
| 9,508,041 | B2 * | 11/2016 | Zhang | F03G 7/04 |
| 9,519,408 | B2 * | 12/2016 | Shoemaker | G06F 3/04886 |
| 9,536,000 | B2 * | 1/2017 | Ramaiyer | G06Q 30/0269 |
| 9,558,452 | B2 * | 1/2017 | Guiver | G06N 7/00 |
| 9,646,317 | B2 * | 5/2017 | John | G06Q 30/0201 |
| 10,091,180 | B1 * | 10/2018 | Moritz | G06F 21/602 |
| 10,504,029 | B2 * | 12/2019 | Edelen | G06N 7/005 |
| 11,501,042 | B2 * | 11/2022 | Steingrimsson | G06N 3/04 |
| 2005/0017954 | A1 * | 1/2005 | Kay | G06F 3/0233 345/169 |
| 2006/0247915 | A1 * | 11/2006 | Bradford | G06F 3/0481 704/1 |
| 2008/0319827 | A1 * | 12/2008 | Yee | G06Q 30/02 705/7.29 |
| 2009/0192798 | A1 * | 7/2009 | Basson | G06F 40/58 704/270 |
| 2009/0307162 | A1 * | 12/2009 | Bui | G06N 5/022 706/54 |
| 2010/0115610 | A1 * | 5/2010 | Tredoux | H04L 9/3231 726/19 |
| 2010/0198768 | A1 * | 8/2010 | Zhou | G06F 9/453 706/47 |
| 2010/0318576 | A1 * | 12/2010 | Kim | G06Q 10/04 707/802 |
| 2011/0258045 | A1 * | 10/2011 | Chickering | G06Q 10/00 706/12 |
| 2012/0023226 | A1 * | 1/2012 | Petersen | H04L 65/608 709/224 |
| 2012/0324403 | A1 * | 12/2012 | Van De Ven | G06F 3/0488 715/863 |
| 2013/0311411 | A1 * | 11/2013 | Senanayake | G06F 16/3349 706/13 |
| 2014/0075328 | A1 * | 3/2014 | Hansen | G06F 3/0487 715/747 |
| 2014/0108994 | A1 * | 4/2014 | Medlock | G06F 3/0237 715/773 |
| 2014/0156566 | A1 * | 6/2014 | Kabiljo | G06N 20/00 706/12 |
| 2014/0351189 | A1 * | 11/2014 | Winn | G06Q 10/10 706/21 |
| 2015/0134389 | A1 * | 5/2015 | Punera | G06N 5/00 705/7.15 |
| 2015/0142717 | A1 * | 5/2015 | Guiver | G06N 5/045 706/46 |
| 2015/0185995 | A1 * | 7/2015 | Shoemaker | G06F 3/0484 715/708 |
| 2015/0261399 | A1 * | 9/2015 | Puzis | G06F 9/451 715/704 |
| 2015/0371023 | A1 * | 12/2015 | Chen | G06F 21/316 706/12 |
| 2016/0036931 | A1 * | 2/2016 | Mathis | H04L 67/535 709/224 |
| 2016/0092039 | A1 * | 3/2016 | Chien | H04L 51/58 715/752 |
| 2016/0360336 | A1 * | 12/2016 | Gross | H04M 1/72403 |
| 2017/0004408 | A1 * | 1/2017 | Edelen | G06N 7/01 |
| 2017/0004409 | A1 * | 1/2017 | Chu | G06N 7/005 |
| 2017/0031575 | A1 * | 2/2017 | Dotan-Cohen | G06F 3/038 |
| 2017/0076089 | A1 * | 3/2017 | Turgeman | H04L 63/08 |
| 2017/0140285 | A1 * | 5/2017 | Dotan-Cohen | G06F 9/453 |
| 2018/0012143 | A1 * | 1/2018 | Hansen | G06N 5/022 |
| 2018/0018590 | A1 * | 1/2018 | Szeto | G16H 50/20 |
| 2018/0053108 | A1 * | 2/2018 | Olabiyi | B60W 50/0097 |
| 2018/0069867 | A1 * | 3/2018 | Grajek | H04W 12/062 |
| 2018/0217717 | A1 * | 8/2018 | Yasuda | B60K 35/00 |
| 2018/0329957 | A1 * | 11/2018 | Frazzingaro | G06F 3/167 |
| 2019/0087529 | A1 * | 3/2019 | Steingrimsson | G06F 30/27 |
| 2019/0281249 | A1 * | 9/2019 | Grafton | G06F 9/451 |
| 2019/0340202 | A1 * | 11/2019 | Kandur Raja | G06F 16/90332 |

OTHER PUBLICATIONS

Peitsang Wu, Kung-Jiuan Yang, Yung-Yao Hung, Bao-Yuan Huang, The Study of VMI Inventory Decision Support System Using Neural Network Technology, Aug. 22, 2008, 4 pages (Year: 2008).*
Ziqing Xia, Kaikai Duan, Centelles Chulia, Rahul Srivastava, Bayesian vs Frequentist, retrieved from—https://indico.cern.ch/event/568904/contributions/2651065/attachments/1487369/2310671/BvsF.pdf, Jul. 4, 2017, 19 pages (Year: 2017).*
Mathias Johansson, Tomas Olofsson, Bayesian Model Selection for Markov, Hidden Markov, and Multinomial Models, retrieved from—https://ieeexplore.ieee.org/abstract/document/4063357, Jan. 15, 2007, 4 pages (Year: 2007).*
Tom Loredo, Probability and Frequency (Lecture 3), retrieved from—hhttps://astrostatistics.psu.edu/samsi06/tutorials/tut1loredol3.pdf, Jan. 23, 2006, 28 pages (Year: 2006).*
Abel Rodriguez, Gavino Puggioni, Mixed frequency models: Bayesian approaches to estimation and prediction, retrieved from—https://www.sciencedirect.com/science/article/pii/S0169207010000154, Feb. 21, 2010, 23 pages (Year: 2010).*
Jake VanderPlas, Frequentism and Bayesianism: A Python-driven Primer, retrieved from—https://arxiv.org/pdf/1411.5018.pdf, Nov. 18, 2014, 9 pages (Year: 2014).*
Bernoulli NB vs MultiNomial NB, How to choose among different NB algorithms?, retrieved from—https://stats.stackexchange.com/questions/258458/bernoulli-nb-vs-multinomial-nb-how-to-choose-among-different-nb-algorithms, Jan. 27, 2017, 2 pages (Year: 2017).*
Enric Junque de Fortuny, David Martens, and Foster Provost, Predictive Modeling With Big Data: Is Bigger Really Better?, retrieved from—https://www.liebertpub.com/doi/pdf/10.1089/big.2013.0037, Dec. 2013, 12 pages (Year: 2013).*
Kendall Fortney, 10 Machine Learning Flavors in sklearn, retrieved from—https://medium.com/@kefortney/10-machine-learning-flavors-in-sklearn-948206342da2, Feb. 16, 2017, 9 pages (Year: 2017).*
Implementing 3 Naive Bayes classifiers in scikit-learn, retrieved from—https://hub.packtpub.com/implementing-3-naive-bayes-classifiers-in-scikit-learn/, May 7, 2018, 11 pages (Year: 2018).*

(56) References Cited

OTHER PUBLICATIONS

Kenzo Takahashi, Naive Bayes from Scratch in Python, retrieved from—https://kenzotakahashi.github.io/naive-bayes-from-scratch-in-python.html, Jan. 17, 2016, 13 pages (Year: 2016).*
How to decide when to use Naive Bayes for classification, retrieved from—https://discuss.analyticsvidhya.com/t/how-to-decide-when-to-use-naive-bayes-for-classification/5720, Oct. 2015, 4 pages (Year: 2015).*
What is the best form (Gaussian, Multinomial) of Naive Bayes to use with categorical (one-hot encoded) features?, retrieved from—https://stats.stackexchange.com/questions/215191/what-is-the-best-form-gaussian-multinomial-of-naive-bayes-to-use-with-categor, May 29, 2016, 3 pages (Year: 2016).*
Vangelis Metsis, Ion Androutsopoulos, Georgios Paliouras, Spam Filtering with Naive Bayes—Which Naive Bayes?, retrieved from—https://www2.aueb.gr/users/ion/docs/ceas2006_paper.pdf, Jul. 27-28, 2006, 9 pages (Year: 2006).*
Matt Gormley, 10-701 Introduction to Machine Learning, retrieved from—https://www.cs.cmu.edu/~mgormley/courses/10701-f16/slides/lecture3.pdf, Sep. 14, 2016, 63 pages (Year: 2016).*
Mixing categorial and continuous data in Naive Bayes classifier using scikit-learn, retrieved from—https://stackoverflow.com/questions/14254203/mixing-categorial-and-continuous-data-in-naive-bayes-classifier-using-scikit-lea, Jan. 10, 2013, 5 pages (Year: 2010).*
Francisco J. Samaniego, A Comparison of the Bayesian and Frequentist Approaches to Estimation, retrieved from—https://www.uaar.edu.pk/fs/books/17.pdf, 2010, 235 pages (Year: 2010).*
Henrique X. Goulart, Mauro D. L. Tosi, Daniel Soares-Gonc, alves, Rodrigo F. Maia, Guilherme Wachs-Lopes, Hybrid Model for Word Prediction Using Naive Bayes and Latent Information, Mar. 2, 2018, 16 pages (Year: 2018).*
Rodrigo Barbosa de Santis, Eduardo Pestana de Aguiar, Leonardo Goliatt, Predicting material backorders in inventory management using machine learning, 2017, 6 pages (Year: 2017).*
Yan Tang Demey, Mikael Wolff, SIMISS: A Model-Based Searching Strategy for Inventory Management Systems, 2016, 11 pages (Year: 2016).*
Andrew R. Golding, A Bayesian hybrid method for context-sensitive spelling correction, Jun. 3, 1996, 15 pages (Year: 1996).*

\* cited by examiner

SYSTEM AND METHOD FOR INTELLIGENT MULTI-MODAL INTERACTIONS IN MERCHANDISE AND ASSORTMENT PLANNING

CROSS-REFERENCE TO RELATED APPLICATIONS

The present disclosure is related to that disclosed in the U.S. Provisional Application No. 62/678,671, filed May 31, 2018, entitled "System and Method for Intelligent Multi-modal Interactions in Merchandise and Assortment Planning." U.S. Provisional Application No. 62/678,671 is assigned to the assignee of the present application. The subject matter disclosed in U.S. Provisional Application No. 62/678,671 is hereby incorporated by reference into the present disclosure as if fully set forth herein. The present invention hereby claims priority under 35 U.S.C. § 119 (e) to U.S. Provisional Application No. 62/678,671.

TECHNICAL FIELD

The present disclosure relates generally to multimodal interactions and specifically to a system and method intelligent multi-modal interactions in merchandise and assortment planning.

BACKGROUND

Enterprise applications, such as, assortment planning and merchandise planning, often require users to manipulate and work with large amounts of data involving products, attributes, images, and performance measures. Users often work with hundreds of products, such as, reviewing their characteristics, past performance, store placements, and reconciling financial goals, and strategies. These complex, repetitive tasks require users to sift through large datasets, sort relevant data from irrelevant data, generate visualizations, and make decisions. Present techniques for interacting with assortment planning and merchandise planning applications, such as a mouse, keyboard, or (in infrequent cases) voice recognition software, are inefficient, unnatural, inflexible, and distracting.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
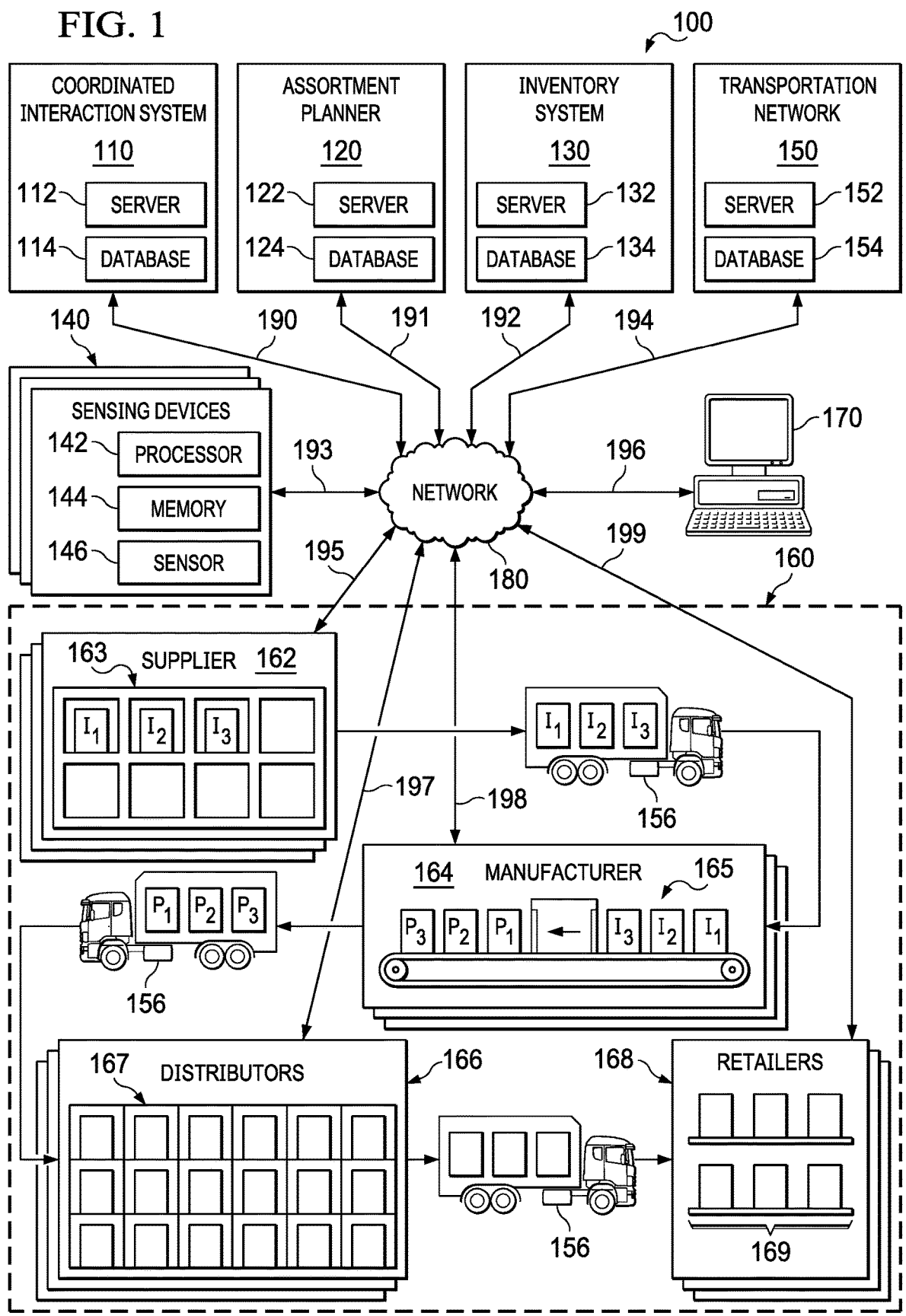
FIG. 1 illustrates an exemplary supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to an assortment planning system and method that utilize a diverse spectrum of user inputs and an adaptive, predictive coordinated interaction system to allow users to perform assortment planning tasks quickly and naturally. According to embodiments, aspects of the following disclosure monitor and track users' eyes, head and hand movements, gestures, voice inputs, and tactile inputs (such as, for example, inputs made to keyboards, computer mice, touchscreens, and the like) to allow users to issue commands and request information in a variety of natural and efficient ways. In addition, aspects of the following disclosure contextually render a user interface and data based on user recognition, wherein the coordinated interaction system predicts user actions and anticipates user requests based on the particular user's previous interactions with the coordinated interaction system. Among other things, this combination of input options and predictive user tracking permit users to input assortment planning commands in a supply chain network with enhanced speed and ease of use, freeing the users to focus on making assortment planning decisions.

FIG. 1 illustrates an exemplary supply chain network 100 according to a first embodiment. Supply chain network 100 comprises coordinated interaction system 110, assortment planner 120, inventory system 130, one or more sensing devices 140, transportation network 150, one or more supply chain entities 160, computer 170, network 180, and communication links 190-199. Although a single coordinated interaction system 110, a single assortment planner 120, a single inventory system 130, one or more sensing devices 140, a single transportation network 150, one or more supply chain entities 160, a single computer 170, a single network 180, and communication links 190-199 are shown and described, embodiments contemplate any number of coordinated interaction systems 110, assortment planners 120, inventory systems 130, sensing devices 140, transportation networks 150, supply chain entities 160, computers 170, networks 180, or communication links 190-199, according to particular needs.

According to embodiments, coordinated interaction system 110 comprises server 112 and database 114. As described in more detail below, embodiments of coordinated interaction system 110 monitor any combination of one or more modes of user input (including, for example, a mouse, a keyboard, a touchscreen, voice commands, eye movement and position, gestures, and the like), create data-rich monitoring of user interactions and behavior, and use artificial intelligence (AI) to generate personalized applications, workspaces, data presentations, and system actions. By way of example, coordinated interaction system 110, one or more sensing devices 140, and the one or more inputs of computer 170 (1) monitor a user's eyes, head, and hands; (2) listen to and interpret voice commands; and (3) monitor user reactions to system actions initiated by coordinated interaction system 110, thereby permitting the delivery of an integrated and coordinated user experience that is continuously learning to adapt to the user's behavior and preferences. In a further non-limiting example, coordinated interaction system 110 monitors user movement, position, gestures, voice, behavior, and the like to manipulate content, render information, and perform actions on an enterprise application, such as: (1) contextually rendering a user interface and data based on user recognition; (2) automatically displaying a product attributes screen with the details of the product based on the user gazing at the product for a predetermined amount of time (for example, a few seconds); (3) zooming in to view data more clearly or to drill down into an object based on monitoring a user's focus on a particular area of the screen; (4) closing or opening a window or searching products with specific attribute values based on a voice command; or (5) invoking help processes and searching help topics based on voice commands or other user inputs.

Figure 2:
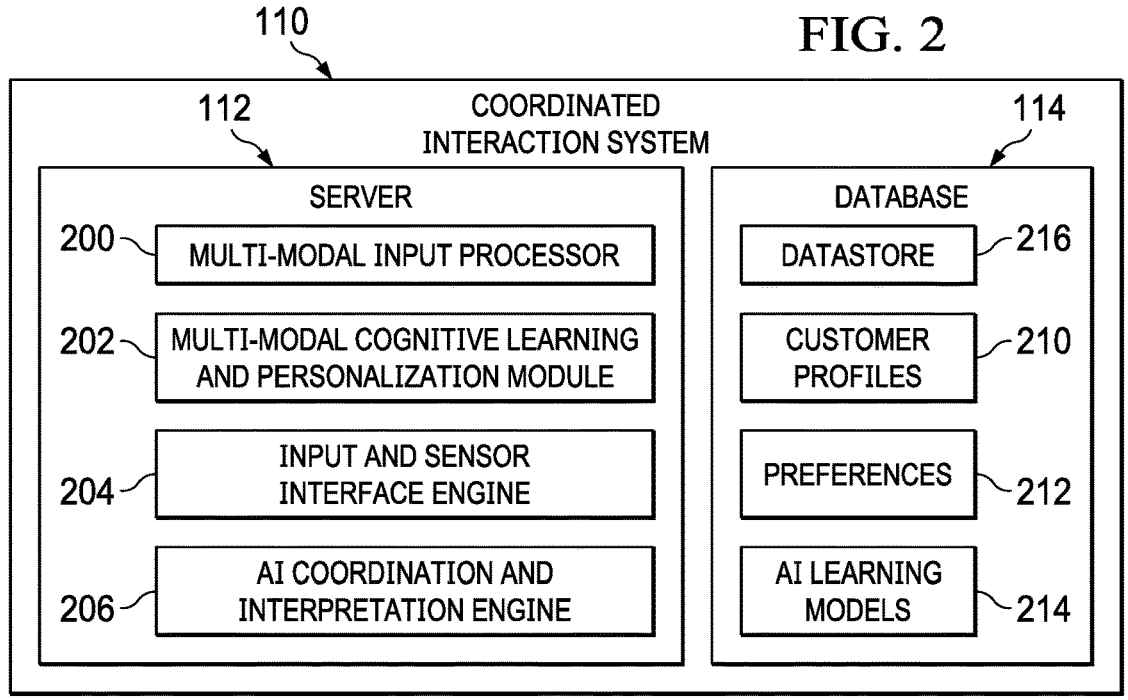
FIG. 2 illustrates the coordinated interaction system of FIG. 1 in greater detail, according to an embodiment.

According to embodiments and as described in more detail below, server 112 of coordinated interaction system 110 may comprise one or more modules (such as, for example, multi-modal input processor 200 or multi-modal cognitive learning and personalization module 202, as shown in FIG. 2) that receive input from one or more sensing devices 140 to track a user's eye and head movement and position, capture and decode voice commands using natural language processing, track user actions via a mouse, keyboard, touchscreen, or other tactile input device, and interpret the user's movement, position, gestures, voice, and actions (such as actions initiated on computer 170 by a user employing any of the described input devices) to manipulate content displayed on one or more display devices. For example, a user may interact with assortment planning applications using a graphical user interface (GUI) to analyze sales and demand data, sort data by customer profile, identify collections and groups of products that customers purchase together, identify influences for the changes or stability of customer preferences over time, profile one or more customer segments, and/or generate product assortments to meet the preferences of customers. Embodiments of coordinated interaction system 110 control and interact with enterprise applications, such as, for example, assortment planners 120.

In one embodiment, assortment planner 120 comprises server 122 and database 124. As explained in more detail below, assortment planner 120 determines product assortments and places orders for products in an assortment. According to embodiments, assortment planner 120 chooses an assortment of products to sell during a planning period that matches predicted customer preferences during the same planning period. As an example, this may include, for a clothing retailer, choosing an assortment of different clothing products that will match the style, colors, season, and trends predicted to be favored by customers during a planning period.

In addition, or as an alternative, each item of a product, such as clothing, may be defined by one or more attributes, including, for example, color, material, design, pattern, length, or the like. According to embodiments, attributes comprise any categorical characteristic or quality of an item, and an attribute value may be a specific value or identity for the one or more items according to the categorical characteristic or quality. Each attribute may have a different attribute value. These attribute values include, by way of non-limiting example, red, blue, or green (for color); silk, cotton, or polyester (for material); fashion, basic, or classic (for design); striped, floral, or plaid (for pattern); long, short, or high (for length); and other similar attributes and attribute values, according to particular needs. These attributes also determine, at least in part, customer preferences, individually and as customer segments defined by similar customer shopping behavior, preferences for purchasing items with particular attribute values, or a combination of both.

In addition, products may be organized in product categories. A product category indicates a level in a product hierarchy under which all products are described by the same attributes and/or the products are perceived by customers as being substitutable. For example, product category levels in the clothing retail industry include women's dresses, men's pants, women's shoes, men's shoes, and the like, according to particular needs. However, embodiments contemplate product category levels comprising more specificity such as, for example, women's athletic shoes, women's casual shoes, and other like categories. Embodiments contemplate product category levels for retail products that are more specific or less specific categories of products, depending on particular needs. Although assortment planning and attributes are described in connection with a clothing retailer, embodiments contemplate assortment planning with attributes of any retailers, including, for example, fashion retailers, grocery retailers, parts retailers, and other like retailers.

According to embodiments, inventory system 130 comprises a server 132 and a database 134. Server 132 is configured to receive and transmit item data, including item identifiers, pricing data, attribute data, inventory levels, and other like data about one or more items at one or more locations in supply chain network 100. Server 132 stores and retrieves item data from database 134 and/or one or more locations in supply chain network 100.

According to embodiments, one or more sensing devices 140 comprise one or more processors 142, memory 144, and one or more sensors 146 and may include any suitable input device, output device, fixed or removable computer-readable storage media, or the like. As explained in more detail below, one or more sensing devices 140 comprise one or more imaging sensors and microphones (including cameras and microphones coupled with a computer, a monitor, a workstation, a mobile device, and the like). One or more sensing devices 140 monitor a user's eye movements and location, facial features, gestures, voice, and the like to control one or more enterprise applications, such as, for example, a user interface for assortment planning. In addition, one or more sensing devices 140 identify users and items near the one or more sensors and generate a mapping of the user or item in supply chain network 100. According to embodiments, inventory system 130 and transportation network 150 use mapping of an item to locate the item in supply chain network 100. The location of the item is then used to coordinate the storage and transportation of items in supply chain network 100 to implement one or more product assortments generated by assortment planner 120.

One or more sensing devices 140 may comprise one or more mobile handheld devices such as, for example, a smartphone, a tablet computer, a wireless device, or the like. In addition, or as an alternative, one or more sensing devices 140 may comprise one or more networked electronic devices configured to transmit item identity information to one or more databases as an item passes by or is scanned by one or more sensing devices 140. This may include, for example, a stationary scanner located at one or more supply chain entities 160 which identifies items as the items pass near the scanner, e.g. a point of sale system at one or more retailers 168 that records transaction data 410 and associates transaction data 410 with product data 412, store data 414, customer data 418, market data, time data, price data, discount data, and the like with product identity and attributes. The one or more sensors 146 of one or more sensing devices 140 comprise an imaging sensor, such as a camera, scanner, electronic eye, photodiode, charged coupled device (CCD), or any other sensor that detects images of objects. In addition, or as an alternative, the one or more sensors 146 comprise a radio receiver and/or transmitter configured to read an electronic tag, such as, for example, an RFID tag.

Transportation network 150 comprises a server 152 and a database 154. According to embodiments, transportation network 150 directs one or more transportation vehicles 156 to ship one or more items between one or more supply chain entities 160, based, at least in part, on the product assortment generated by assortment planner 120. Transportation vehicles 156 may comprise, for example, any number of trucks, cars, vans, boats, airplanes, unmanned aerial vehicles (UAVs), cranes, robotic machinery, or the like. Transportation vehicles 156 may possess radio, satellite, or other communication devices that communicate location information (such as, for example, geographic coordinates, distance from a location, global positioning satellite (GPS) information, or the like) with coordinated interaction system 110, inventory system 130, one or more sensing devices 140, transportation network 150, and/or one or more supply chain entities 160 to identify the location of transportation vehicles 156 and the location of any inventory or shipment located on transportation vehicles 156. In addition to the product assortment, the number of items shipped by transportation vehicles 156 in transportation network 150 may also be based, at least in part, on an inventory policy, target service levels, the number of items currently in stock at an inventory of one or more supply chain entities 160, the number of items currently in transit in transportation network 150, forecasted demand, a supply chain disruption, and the like.

According to embodiments, supply chain network 100 may operate on one or more computers 170, which may be integral to or separate from the hardware and/or software that supports coordinated interaction system 110, assortment planner 120, inventory system 130, one or more sensing devices 140, transportation network 150, and one or more supply chain entities 160. Computer 170 may include any suitable input device, such as a keypad, mouse, touch screen, microphone, or other device to input information. Computer 170 may also comprise one or more output devices, such as a computer monitor, which may convey information associated with the operation of supply chain network 100, including digital or analog data, visual information, or audio information. Computer 170 may include fixed or removable computer-readable storage media, including a non-transitory computer readable medium, magnetic computer disks, flash drives, CD-ROMs, in-memory devices or other suitable media to receive output from and provide input to supply chain network 100. Computer 170 may include one or more processors and associated memory to execute instructions and manipulate information according to the operation of supply chain network 100 and any of the methods described herein. In addition, or as an alternative, embodiments contemplate executing instructions on computer 170 that cause computer 170 to perform functions of the methods described herein. Further examples may also include articles of manufacture including tangible computer-readable media that have computer-readable instructions encoded thereon, and the instructions may comprise instructions to perform functions of the methods described herein. According to some embodiments, the functions and methods described in connection with one or more sensing devices 140 may be emulated by one or more modules configured to perform the functions and methods as described.

In addition, and as discussed herein, supply chain network 100 may comprise a network 180 having processing and storage devices at one or more locations, as would be understood by a person of ordinary skill in the art. These locations may be local to or remote from coordinated interaction system 110, assortment planner 120, inventory system 130, one or more sensing devices 140, transportation network 150, and one or more supply chain entities 160. In addition, each of the one or more computers 170 may be a work station, personal computer (PC), network computer, notebook computer, tablet, personal digital assistant (PDA), cell phone, telephone, smartphone, wireless data port, augmented or virtual reality headset, or any other suitable computing device capable of connecting to network 180. According to embodiments, one or more users may be associated with coordinated interaction system 110, assortment planner 120, inventory system 130, one or more sensing devices 140, transportation network 150, and one or more supply chain entities 160. These one or more users may include, for example, a "buyer" or a "planner" handling retail planning, such as assortment planning, merchandise planning, customer preference segmentation, item inventory management, item storage and shipment management, and/or one or more related tasks within supply chain network 100. In addition, or as an alternative, these one or more users within supply chain network 100 may include, for example, one or more computers programmed to handle autonomously, among other things, evaluation of various levels of retail process management, determining an assortment plan, forecasting demand, controlling manufacturing equipment, and adjusting various levels of manufacturing and inventory levels at various stocking points and distribution centers, and/or one or more related tasks within supply chain network 100.

According to embodiments, one or more supply chain entities 160 may comprise one or more suppliers 162, one or more manufacturers 164, one or more distributors 166, and one or more retailers 168, as best seen in FIG. 1. By way of example, supplier 162 may be any suitable entity that offers to sell or otherwise provides one or more items (i.e., materials, components, or products) to one or more manufacturers 164. Supplier 162 may comprise one or more automated distribution systems 163 that automatically transport products to one or more manufacturers 164 based, at least in part, on the evaluation of various levels of retail process management, determining an assortment plan, forecasting demand, controlling manufacturing equipment, and adjusting various levels of manufacturing and inventory levels at various stocking points and distribution centers, and/or one or more related tasks within supply chain network 100. In addition, or as an alternative, each of the one or more items may be represented in supply chain network 100 by an identifier, including, for example, Stock-Keeping Unit (SKU), Universal Product Code (UPC), serial number, barcode, tag, RFID, or any other device that encodes identifying information. As discussed above, one or more sensing devices 140 may generate a mapping of one or more items at the location of supplier 162 by scanning an identifier associated with an item or associating the image of an item with an identifier stored in a database 124 or 134. Transportation vehicles 156 may permit supplier 162 to transport items to one or more manufacturers 164.

Manufacturers 164 may be any suitable entity that manufactures at least one product. Manufacturers 164 may use one or more items during the manufacturing process to produce any manufactured, fabricated, assembled, or otherwise processed item, material, component, good or product. In one embodiment, a product represents an item that is: ready to be supplied to, for example, one or more supply chain entities 160 in supply chain network 100, such as retailers 168; an item that needs further processing; or any other item. Manufacturers 164 may, for example, produce and sell a product to suppliers 162, other manufacturers 164, distributors 166, retailers 168, a customer, or any other suitable person or entity. Manufacturers 164 may comprise automated robotic production machinery 165 that produces products based, at least in part, on an evaluation of various levels of retail process management, determining an assortment plan, forecasting demand, controlling manufacturing equipment, and adjusting various levels of manufacturing and inventory levels at various stocking points and distribution centers, and/or one or more related tasks within supply chain network 100.

Distributors 166 may be any suitable entity that offers to store or otherwise distribute at least one product to one or more retailers 168 and/or customers. Distributors 166 may, for example, receive a product from a first of one or more supply chain entities 160 in supply chain network 100 and store and transport the product for a second of one or more supply chain entities 160, such a supplier 162 or a manufacturer 164. Distributors 166 may comprise automated warehousing systems 167 that automatically remove products from and place products into inventory based, at least part, on the evaluation of various levels of retail process management, determining an assortment plan, forecasting demand, controlling manufacturing equipment, and adjusting various levels of manufacturing and inventory levels at various stocking points and distribution centers, and/or one or more related tasks within supply chain network 100.

Retailers 168 may be any suitable entity that obtains one or more products to sell to one or more customers. Retailers 168 may comprise one or more brick-and-mortar or online stores. The one or more retailer 168 may sell products according to rules, strategies, orders, and/or guidelines developed by one or more headquarters (not illustrated in FIG. 1). For example, the retail headquarters may create product assortments, assign product assortments to one or more retailers 168 or retail store clusters, and instruct one or more supply chain entities 160 to supply products in the product assortment to the one or more retailers 168 in an amount sufficient to meet an expected demand or other determined quantity. Retailers 168 may comprise stores with shelving systems 169. Shelving systems 169 may comprise, for example, various racks, fixtures, brackets, notches, grooves, slots, or other attachment devices for fixing shelves in various configurations. These configurations may comprise shelving systems 169 with adjustable lengths, heights, and other arrangements, which may be adjusted by a retailer 168 employee based on computer-generated instructions, or automatically by machinery to place products in a desired location in retailers.

Although one or more supply chain entities 160 are shown and described as separate and distinct entities, the same entity may simultaneously act as any one of one or more supply chain entities 160. For example, one or more supply chain entities 160 acting as a manufacturer 164 might produce a product, and the same entity 160 might then act as a supplier 162 to supply an item to itself or another of one or more one or more supply chain entities 160. Although one example of supply chain network 100 is shown and described, embodiments of the present invention contemplate any configuration of supply chain network 100, without departing from the scope described herein.

In one embodiment, coordinated interaction system 110 may be coupled with network 180 using communication link 190, which may be any wireline, wireless, or other link suitable to support data communications between coordinated interaction system 110 and network 180 during the operation of supply chain network 100. In one embodiment, assortment planner 120 may be coupled with network 180 using communication link 191, which may be any wireline, wireless, or other link suitable to support data communications between assortment planner 120 and network 180 during the operation of supply chain network 100. In one embodiment, inventory system 130 may be coupled with network 180 using communication link 192, which may be any wireline, wireless, or other link suitable to support data communications between inventory system 130 and network 180 during the operation of supply chain network 100. One or more sensing devices 140 may be coupled with network 180 using communication link 193, which may be any wireline, wireless, or other link suitable to support data communications between one or more sensing devices 140 and network 180 during the operation of supply chain network 100. Transportation network 150 may be coupled with network 180 using communication link 194, which may be any wireline, wireless, or other link suitable to support data communications between transportation network 150 and network 180 during the operation of supply chain network 100. One or more supply chain entities 160 may be coupled with network 180 using communication links 195 and 197-199, which may be any wireline, wireless, or other links suitable to support data communications between one or more supply chain entities 160 and network 180 during the operation of supply chain network 100. Computer 170 is coupled with network 180 using communication link 196, which may be any wireline, wireless, or other link suitable to support data communications between computer 170 and network 180 during the operation of supply chain network 100.

Although the communication links 190-199 are shown as generally coupling coordinated interaction system 110, assortment planner 120, inventory system 130, one or more sensing devices 140, transportation network 150, one or more supply chain entities 160, and computer 170 to network 180, each of the coordinated interaction system 110, assortment planner 120, inventory system 130, one or more sensing devices 140, transportation network 150, one or more supply chain entities 160, and computer 170 may communicate directly with each other, according to particular needs.

According to embodiments, network 180 includes the Internet and any appropriate local area networks (LANs), metropolitan area networks (MANs), or wide area networks (WANs) coupling coordinated interaction system 110, assortment planner 120, inventory system 130, one or more sensing devices 140, transportation network 150, one or more supply chain entities 160, and one or more computers 170. For example, data may be maintained locally or externally of coordinated interaction system 110, assortment planner 120, inventory system 130, one or more sensing devices 140, transportation network 150, one or more supply chain entities 160, and the one or more computers 170 and made available to one or more associated users of coordinated interaction system 110, assortment planner 120, inventory system 130, one or more sensing devices 140, transportation network 150, one or more supply chain entities 160, and one or more computers 170 using network 180 or in any other appropriate manner. For example, data may be maintained in a cloud database at one or more locations external to coordinated interaction system 110, assortment planner 120, inventory system 130, one or more sensing devices 140, transportation network 150, one or more supply chain entities 160, and one or more computers 170 and made available to one or more associated users of coordinated interaction system 110, assortment planner 120, inventory system 130, one or more sensing devices 140, transportation network 150, one or more supply chain entities 160, and one or more computers 170 using the cloud or in any other appropriate manner. Those skilled in the art will recognize that the complete structure and operation of network 180 and other components within supply chain network 100 are not depicted or described. Embodiments may be employed in conjunction with known networks and other components.

In accordance with the principles of embodiments described herein, assortment planner 120 may generate a product assortment comprising one or more products sourced from one or more supply chain entities 160. Assortment planner 120 may further calculate a buy quantity and place product orders at the various suppliers 162, manufacturers 164, and/or distributors 166, initiate manufacturing of products at manufacturers 164, and/or determine the assortment and quantity of products to be carried at various retailers 168. Furthermore, assortment planner 120 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 160, and the configuration and quantity of packaging and shipping of items based on the product assortment, current inventory, and/or production levels. For example, the methods described herein include computer 170 receiving product identification data from automated machinery having at least one sensor and the product identification data corresponding to an item detected by the automated machinery. The received product identification data may include an image of the item, an identifier, as described above, and/or other data associated with the item (dimensions, texture, estimated weight, and any other like data). The method may further include computer 170 retrieving the received product identification data in one or more databases 114, 124, 134, or 154 associated with coordinated interaction system 110, assortment planner 120, inventory system 130, transportation network 150, and/or one or more supply chain entities 160 to identify the item corresponding to the data received from the automated machinery.

Computer 170 may also receive, from the automated machinery, a current location of the identified item. Based on the identification of the item, computer 170 may also identify (or alternatively generate) a first mapping in the one or more databases 114, 124, 134, or 154, where the first mapping is associated with the current location of the item. Computer 170 may also identify a second mapping in the one or more databases 114, 124, 134, or 154, where the second mapping is associated with a past location of the identified item. Computer 170 may also compare the first mapping and the second mapping to determine if the current location of the identified item in the first mapping is different than the past location of the identified item in the second mapping. Computer 170 may then send instructions to the automated machinery based, as least in part, on one or more differences between the first mapping and the second mapping such as, for example, to locate item to add to or remove from an inventory of or shipment for one or more supply chain entities 160. In addition, or as an alternative, computer 170 may monitor the supply chain constraints of one or more items at one or more supply chain entities 160 and adjust the orders and/or inventory of one or more supply chain entities 160 based on the supply chain constraints. In addition, or as an alternative, computer 170 may monitor the inventory of one or more supply chain entities 160 in supply chain network 100 so that when the inventory of an item falls to a resupply quantity, computer 170 may initiate one or more processes to automatically adjust product mix ratios, inventory levels, production of products of manufacturing equipment, and proportional or alternative sourcing of one or more supply chain entities 160 until the inventory is resupplied to a target level.

FIG. 2 illustrates coordinated interaction system 110 of FIG. 1 in greater detail in accordance with the first embodiment. As discussed above, coordinated interaction system 110 comprises server 112 and database 114. Although coordinated interaction system 110 is shown in this particular embodiment as comprising a single server 112 and a single database 114, embodiments contemplate any suitable number of processors, servers or databases internal to or externally coupled with coordinated interaction system 110, according to particular needs.

According to embodiments, server 112 further comprises multi-modal input processor 200, multi-modal cognitive learning and personalization module 202, input and sensor interface engine 204 and AI coordination and interpretation engine 206. According to embodiments, input and sensor interface engine 204 monitors any combination of one or more modes of user input, including, for example, a mouse, a keyboard, a touchscreen, voice commands, eye movement and position, gestures, and the like, to create data-rich monitoring of user actions, inputs, and behavior. Input and sensor interface engine 204 is coupled with the one or more sensors and/or the one or more tactile input devices using one or more communication links, which may be any wireline, wireless, or other link suitable to support data communications between input and sensor interface engine 204, sensing devices 140, one or more tactile input devices, and network 180 during operation of supply chain network 100, such as, for example, merchandising assortment planning. For example, input and sensor interface engine 204 may communicate over one or more communication links to send and receive data from one or more sensing devices 140 to monitor a user's eyes, head, hands, voice commands, and the like. In addition, input and sensor interface engine 204 may communicate over one or more communication links to send and receive data associated with user inputs from the one or more tactile input devices.

According to embodiments, AI coordination and interpretation engine 206 uses AI to generate personalized applications, workspaces, data presentations, and system actions by interpreting and coordinating user actions, inputs, and behavior. In addition, AI coordination and interpretation engine 206 delivers an integrated and coordinated user experience that continuously learns and adapts to users' behavior and preferences to manipulate content, render information, and perform actions on the application, including as described in more detail below.

Database 114 of coordinated interaction system 110 comprises one or more databases or other data storage arrangements at one or more locations, local to or remote from, coordinated interaction system 110. Database 114 may comprise, for example, customer profiles 210, preferences 212, AI learning models 214, and one or more datastores 216 supporting coordinated interaction system 110. Although database 114 is illustrated and described as comprising one set of customer profiles 210, one set of preferences 212, one set of AI learning models 214, and a single datastore 216, embodiments contemplate any suitable number or combination of datastores, located at one or more locations, local to, or remote from, AI coordination and interpretation engine 206, according to particular needs.

As described above, coordinated interaction system 110 may be used to control one or more enterprise applications for supply chain planning processes, such as assortment planning. For example, coordinated interaction system 110 may generate personalized applications, workspaces, data presentations, and system actions for assortment planner 120. In addition, or as an alternative, and as described below, AI coordination and interpretation engine 206 learns and adapts to a user's behavior and preferences with assortment planner 120 to manipulate content, render information, and perform actions on the enterprise application.

Figure 3:
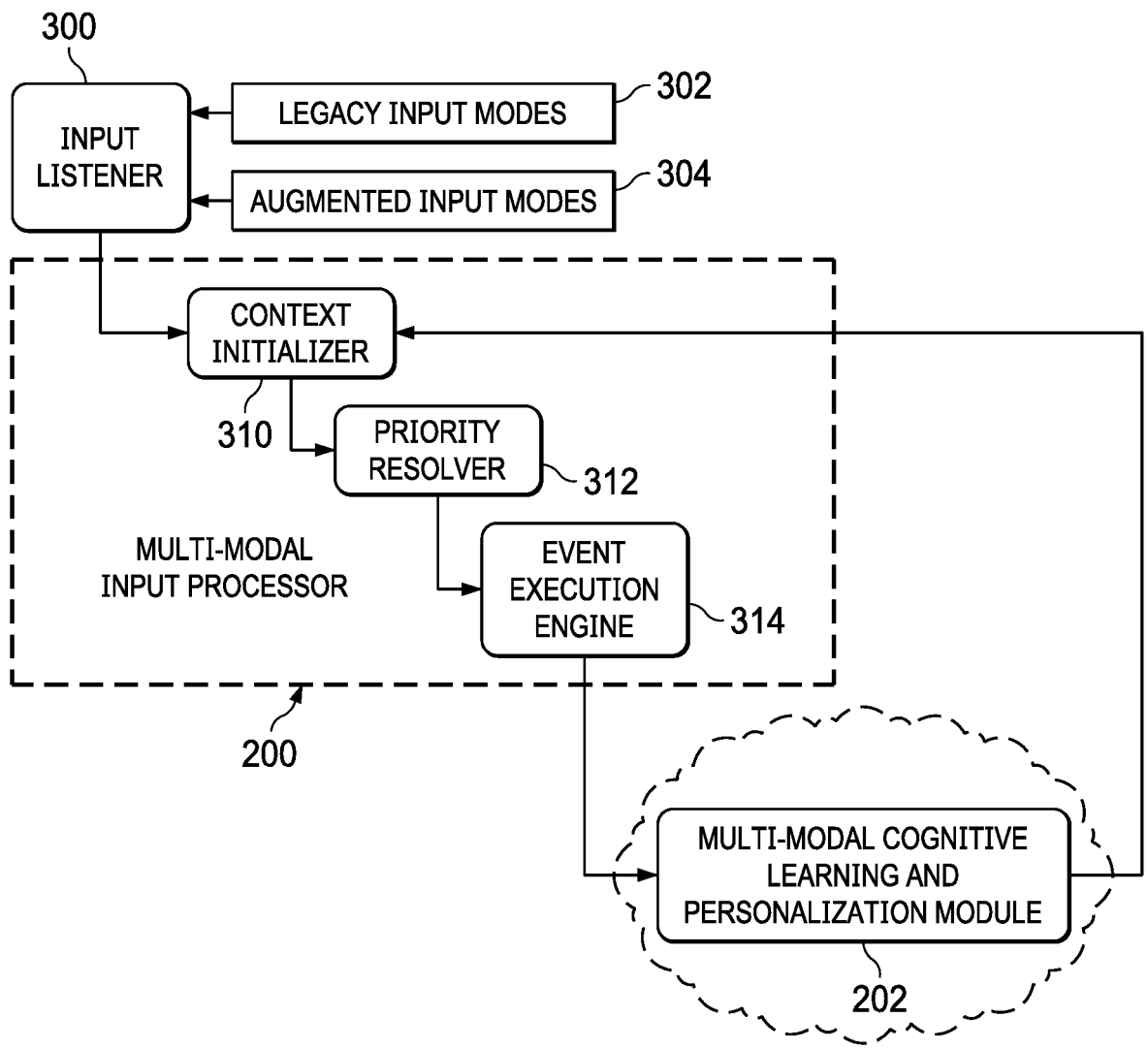
FIG. 3 illustrates the multi-modal input processor and multi-modal cognitive learning and personalization module of FIG. 2 in greater detail, in accordance with an embodiment.

FIG. 3 illustrates multi-modal input processor 200 and multi-modal cognitive learning and personalization module 202 of FIG. 2 in greater detail in accordance with an embodiment. In addition, FIG. 3 comprises input listener 300, multi-modal input processor 200 and multi-modal cognitive learning and personalization module 202. According to embodiments, input listener 300 listens to and/or records input from legacy input modes 302 or augmented input modes 304, and transmits this information to other components of coordinated interaction system 110. For example, legacy input modes 302 may comprise a keyboard, mouse or touchscreen, while augmented input modes 304 may comprise voice input, user face recognition, eye movement, and hand, head and face gestures.

In addition, or as an alternative, multi-modal input processor 200 may comprise a context initializer 310, priority resolver 312 and event execution engine 314. Context initializer 310 is based on the inputs received and coordinated interaction system 110 sets the context and recognizes the user, along with his/her personality and preferences. In addition, multi-modal input processor 200 also learns progressively, as it understands the user's behaviors and ways of working. For example, if a user arrives at work every Monday morning and requests a report, multi-modal input processor 200 begins anticipating this behavior and prepares the report in advance.

Priority resolver 312 resolves the priority of potential conflicting behaviors and the priorities that may be given to legacy inputs. For example, based on the learning, if multi-modal input processor 200 opens a "buy" tab as a default tab and the user's voice requests the opening of a "sales" tab, multi-modal input processor 200 determines the priority to a user's voice input. More specifically, event execution engine 314 determines that although multi-modal input processor 200 typically displays a "buy" tab to the user as that user's default tab, the user's voice request for a sales tab overrides this default setting and the multi-modal input processor 200 thereby opens a "sales" tab. In addition, or as an alternative, as part of a learning function, all type of interactions may be enabled for all users, or only enabled for a particular group of users, according to particular enterprise application needs. Multi-modal input processor 200 may collect user responses for each interactions or a predetermined group of interactions.

In order to explain the operation of multi-modal input processor 200, an example is now given. In the following example, if a user stares at a product on an interface screen for a given amount of time, multi-modal input processor 200 displays a pop-up window having product attributes. In addition, or as an alternative, if a user closes a pop-up window quickly, or within a threshold time period, multi-modal input processor 200 an implication is made that the user did not like, or did not request, this interaction.

TABLE 1

| Data Point Collection | Interaction Type | Duration After Which Pop-Up Window Was Closed | Inference About Use Interaction (Threshold Duration - 30 Seconds) |
|---|---|---|---|
| 1 | Attribute Pop-Up | 10 Seconds | Does not like (0) |
| 2 | Attribute Pop-Up | 25 Seconds | Does not like (0) |
| 3 | Attribute Pop-Up | 2 Minutes | Like (1) |
| 4 | Attribute Pop-Up | 5 Minutes | Like (1) |

Based on the data shown in TABLE 1, multi-modal input processor 200 determines that the user does not like the interaction for the first two times, but that the user begins liking the interaction starting at the third time. As another example, if multi-modal input processor 200 uses a frequentist approach, then the probability of liking an interaction is:

$p=s/n$, where s is the number of times the user likes the interaction and n is the number of times the multi-modal input processor 200 shows the interaction to the user.

In addition, and based on this information, multi-modal input processor 200 does not show the interaction to the user after the first closure which, as a probability of the user liking the interaction, would be zero. According to an embodiment, if multi-modal input processor 200 uses a Bayesian approach to learn using noninformative flat priors, then the probability of liking is:

$$p=(s+1)/(n+2)$$

In addition, based on this information, the interaction does not turn-off after the first data point being calculated.

TABLE 2

| Data Point Collection | Interaction Type | Duration After Which Pop-Up Window Was Closed | Inference About Use Interaction (Threshold Duration-30 Seconds) | Frequentist Probability p = s/n | Frequentist Inference | Bayesian Probability p = (s + 1)/(n + 2) | Bayesian Inference |
|---|---|---|---|---|---|---|---|
| 1 | Attribute Pop-Up | 10 Seconds | Does not like | 0 | Do not show next time | 0.33 | Show |
| 2 | Attribute Pop-Up | 25 Seconds | Does not like | 0 | Interaction not shown | 0.25 | Show |
| 3 | Attribute Pop-Up | 2 Minutes | Like | 0 | Interaction not shown | 0.4 | Show |
| 4 | Attribute Pop-Up | 5 Minutes | Like | 0 | Interaction Not Shown | 0.5 | Show |

As shown in TABLE 2 and according to embodiments, multi-modal input processor 200 presents an inference derived using two methods and determines that a Bayesian method is a better approach. According to embodiments, the Bayesian approach provides a more efficient user interaction. For example, this approach collects data about other user activities, such as the given date and time at which all functionality is used by an analysis and the duration of interaction with each functionality. According to other embodiments, multi-modal input processor 200 constructs a better multinomial model for learning as compared to the Bernoulli model. The multinomial model for a user would utilize multiple functionalities and then choose one functionality to represent the user, whereas, in the previous case, a single decision was made on whether a user liked a suggested interaction.

Figure 4:
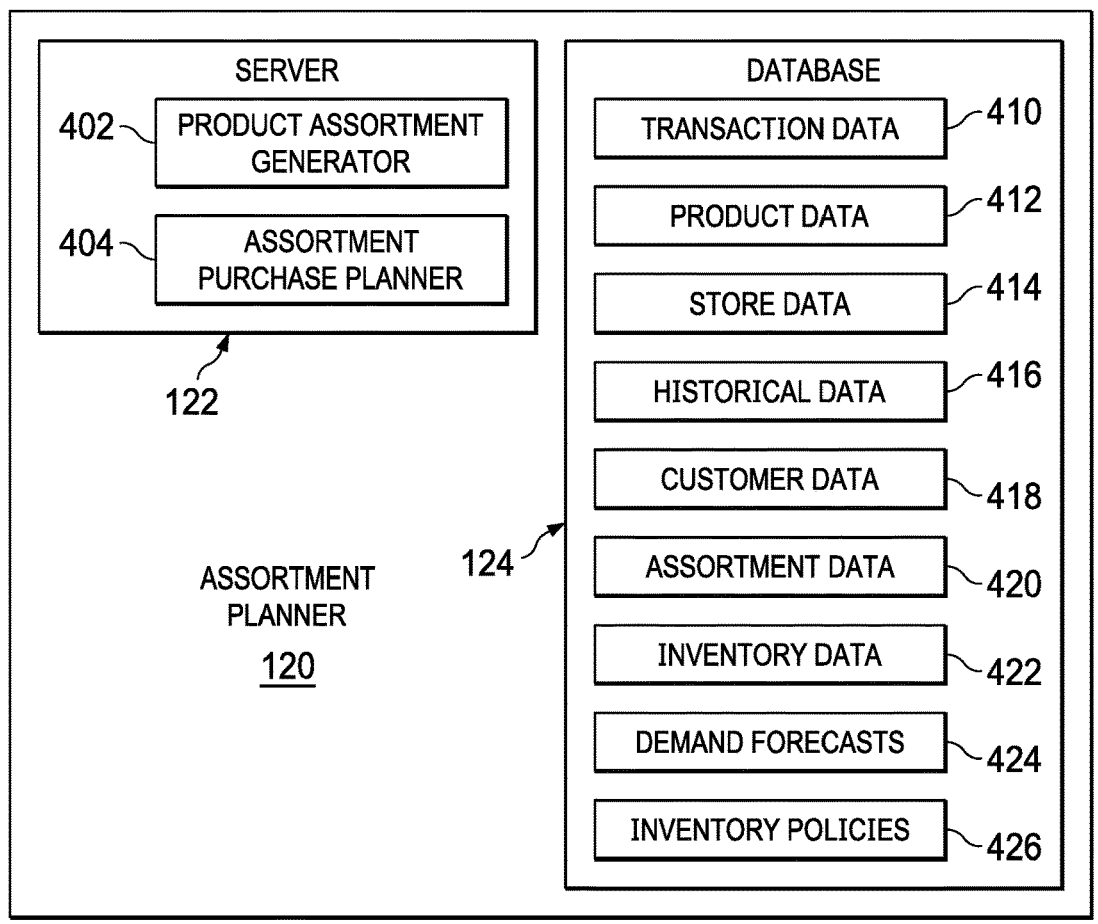
FIG. 4 illustrates the assortment planner of FIG. 1 in greater detail, according to an embodiment.

FIG. 4 illustrates assortment planner 120 of FIG. 1 in greater detail, according to an embodiment. As discussed above, assortment planner 120 comprises server 122 and database 124. According to embodiments, server 122 comprises product assortment generator 402 and assortment purchase planner 404. Although server 122 server is shown and described as comprising a single product assortment generator 402 and a single assortment purchase planner 404, embodiments contemplate any suitable number or combination of these located at one or more locations, local to, or remote from assortment planner 120, such as on multiple servers or computers 170 at any location in supply chain network 100.

Product assortment generator 402 of assortment planner 120 generates a product assortment by indicating the products that will be included or excluded in a product assortment for a particular planning period based on, for example, data regarding sales, profitability, transferable demand, similarity, or the like for any one or more products or assortments. Assortment purchase planner 404 may calculate a purchase quantity of items in an assortment and place an order based on, for example, a new product assortment.

According to embodiments, assortment planning comprises an assortment planning interface having one or more interactive elements for selecting and scoring products for inclusion in a product assortment. The assortment planning interface comprises a notification display, filtering controls, product information and results, and the like. Continuing with the exemplary clothing retail example, the notification display indicates the number of products displayed on the assortment planning interface and information regarding the products, stores, and customers for the displayed data. Although the assortment interface is described in connection with a clothing retailer, embodiments contemplate assortment planning with attributes of any the retailers, including, for example, fashion retailers, grocery retailers, parts retailers, and the like.

In addition, the assortment planning interface provides for locating, filtering, and sorting identified products, using filtering controls and any suitable attribute or business context variable, such as, for example, brand, color, pattern, price band, private label, replenishment, silhouette, and vendor. Although certain particular attributes and business context variables are illustrated, embodiments contemplate searching and filtering products based on any combination of suitable attributes or business context variables.

After one or more products are located for inclusion or removal from a product assortment, an assortment planning dashboard displays the product results to a user in an interactive visualization analysis. The product results represent each of the products with a different interactive element, such as, for example, user selectable elements comprising small boxes representing each product and comprising a checkbox, an identification number, a score, product information and the like. According to embodiments, in response to selecting an empty checkbox, a checkmark will appear in the checkbox and the product will be included in the product assortment results. In response to selecting a checkbox with a checkmark already displayed, the checkmark will disappear, and the product will not be included in the product assortment results. Separate embodiments may contemplate calculating and displaying a score on each of the user selectable elements indicating the product's suitability for a particular store, customer, or customer profile. For example, the assortment planning interface may indicate a first exemplary customer profile is selected, and the score illustrates the satisfaction level of each product for a selected customer profile. When a different customer profile is selected, the assortment planning interface may automatically update the scores based on the newly-selected customer profile. In addition, embodiments of the assortment planning interface provide for selecting one or more products to place in a product assortment, based on the updated scores for each customer profile.

In accordance with the principles of embodiments described herein, assortment planner 120 may monitor the inventory of the one or more products and adjust the inventory, product assortment, removal or addition of items, and new collection assortment of retailers 168 and/or the other one or more supply chain entities 160, based at least in part on the interactive visualization analysis.

Assortment planner 120 database 124 of the assortment planner 120 may comprise one or more databases or other data storage arrangements at one or more locations, local to, or remote from, server 122. According to embodiments, database 124 may comprise transaction data 410, product data 412, store data 414, historical data 416, customer data 418, assortment data 420, inventory data 422, demand forecasts 424, and/or inventory policies 426. Although FIG. 4 illustrates database 124 as comprising transaction data 410, product data 412, store data 414, historical data 416, customer data 418, assortment data 420, inventory data 422, demand forecasts 424, and inventory policies 426, embodiments contemplate any suitable number or combination of these, located at one or more locations, local to, or remote from, assortment planner 120 according to particular needs.

Transaction data 410 may comprise recorded sales and returns transactions and related data, including, for example, a transaction identification, time and date stamp, channel identification (such as stores or online touchpoints), product identification, actual cost, selling price, sales quantity, customer identification, promotions, and or the like. In addition, transaction data 410 is represented by any suitable combination of values and dimensions, aggregated or un-aggregated, such as, for example, sales per week, sales per week per location, sales per day, sales per day per season, or the like.

Product data 412 of database 124 may comprise one or more data structures comprising products identified by, for example, a product identification (such as a Stock Keeping Unit (SKU), Universal Product Code (UPC) or the like) and one or more attributes and attribute types associated with the product ID, which may be stored as attribute data. Product data 412 may comprise any attributes of one or more products organized according to any suitable database structure, and sorted by, for example, attribute type, attribute, value, product identification, or any suitable categorization or dimension.

Store data 414 may comprise data describing the stores of the one or more retailers 168 and related store information. Store data 414 may comprise, for example, a store ID, store description, store location details, store location climate, store type, store opening date, lifestyle, store area (expressed in, for example, square feet, square meters, or other suitable measurement), latitude, longitude, and other similar data.

Historical data 416 may comprise data relating to one or more products, including, for example, sales data, geographical regions, store locations, inventory data 422, time periods, seasonality, or other types of dimensions. Customer data 418 may comprise customer identity information, including, for example, customer relationship management data, loyalty programs, and mappings between product purchases and one or more customers so that the customer associated with a transaction may be analyzed.

Assortment data 420 may comprise the identity of products selected for an assortment and the attributes associated with those products. According to embodiments, assortment data 420 comprises the identity and attributes of products selected for one or more future, current, or past time periods.

Inventory data 422 may comprise any data relating to current or projected inventory quantities or states, order rules, or the like. For example, inventory data 422 comprises the current level of inventory for each item at one or more stocking points across supply chain network 100. In addition, inventory data 422 comprises order rules that describe one or more rules or limits on setting an inventory policy, including, but not limited to, a minimum order quantity, a maximum order quantity, a discount, and a step-size order quantity, and batch quantity rules. According to some embodiments, assortment planner 120 accesses and stores inventory data 422 in the database, which may be used by assortment planner 120 to place orders, set inventory levels at one or more stocking points, initiate manufacturing of one or more components, or the like. In addition, or as an alternative, inventory data 422 may be updated by receiving current item quantities, mappings, or locations from inventory system 130, one or more sensing devices 140, and/or transportation network 150.

Demand forecasts 424 may indicate future expected demand based on, for example, any data relating to past sales, past demand, purchase data, promotions, events, or the like of one or more supply chain entities 160. Demand forecasts 424 may cover a time interval such as, for example, by the minute, hour, daily, weekly, monthly, quarterly, yearly, or any suitable time interval, including substantially in real time.

Inventory policies 426 may comprise any suitable inventory policy describing the reorder point and target quantity, or other inventory policy parameters that set rules for assortment planner 120 to manage and reorder inventory. Inventory policies 426 may be based on target service level, demand, cost, fill rate, or the like. According to embodiments, inventory policies 426 may comprise target service levels that ensure that a service level of one or more supply chain entities 160 is met with a certain probability. For example, one or more supply chain entities 160 may set a service level at 95%, meaning one or more supply chain entities 160 will set the desired inventory stock level at a level that meets demand 95% of the time. Although a particular service level target and percentage is described, embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, assortment planner 120 may determine a replenishment order according to one or more replenishment rules, which, among other things, indicates to one or more supply chain entities 160 to determine or receive inventory to replace the depleted inventory.

According to embodiments, assortment planning often requires retailer assortment decisions having one or more factors, such as, for example, company objectives, positioning, space and display costs, discontinuing costs, handling costs, inventory costs, economic conditions, competitor's assortments, and turnover rates. In addition, the retailer assortment decisions may comprise dimensions such as completeness of assortment, price, quality, value, fashion level, brand emphasis, and the like. According to embodiments, coordinated interaction system 110 manages data according to the dimensions and factors of assortment decisions to learn and predict information relevant to the user and the manner to display and notify the user of that information. For example, coordinated interaction system 110 may understand and manage the workflow of assortment planning activities, such as, for example, selecting products, working with marketing promotions, arranging assortments, collaborative planning processes, and the like. For example, embodiments of coordinated interaction system 110 may synchronize calendar appointments related to assortment planning activities, identify deadlines for finalizing plans or generating reports, and coordinate with the roles and responsibilities of the users to understand the current context and life cycle of the particular assortment, and to perform actions that the system predicts will benefit the user or accord with the user's preferences. This provides for a personalized retail planning application using AI to predict information and actions that will be relevant to the current user and provide interactive responses. Although examples are illustrated in connection with merchandising and assortment planning, coordinated interaction system 110 may be used in connection with any enterprise stage application.

As discussed above, a fashion retailer may use merchandise and assortment planning to plan clothing products, such as, for example, a user who uses an assortment planner 120 to define what kind of shirts to launch for the spring summer collection. As part of that assortment planning process, the user would manipulate product data 412 and images using an assortment planner 120 interface to view important product attributes, score assortments according to business objectives, assign products to stores, set minimum inventory levels, and the like. Embodiments of the disclosed coordinated interaction system 110 speed up the retail planning process for users by identifying gestures, facial expressions, voice modulation, and mannerisms to predict and automate one or more of assortment planning actions. As described below, embodiments of coordinated interaction system 110 perform one or more assortment planning actions in coordination with a user by integrating information from input and sensors with context-specific data and customer profiles, as described below.

Figure 5:
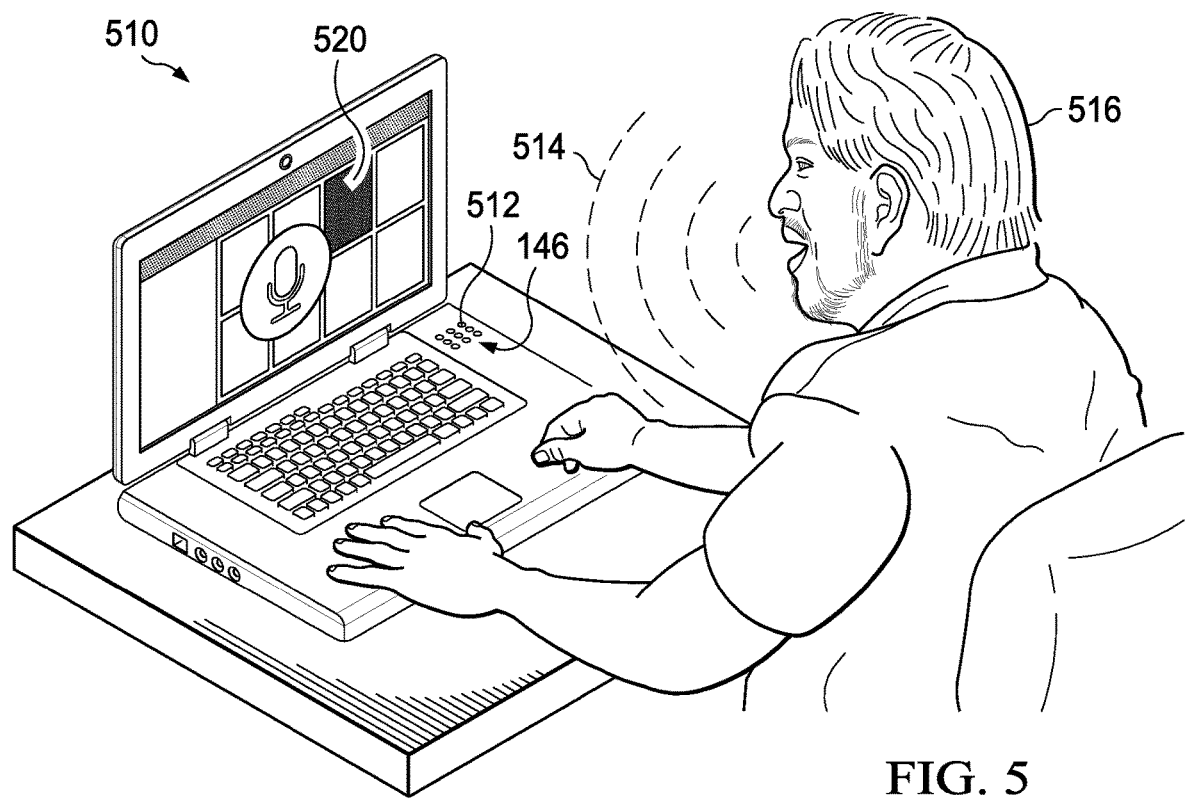
FIG. 5 illustrates the voice recognition interface of the coordinated interaction system, according to an embodiment.

FIG. 5 illustrates voice recognition interface 510 of coordinated interaction system 110, according to an embodiment. According to embodiments, voice recognition interface 510 may comprise one or more sensors 146, such as computer microphone 512, which receives audio inputs 514 from user 516 and transforms audio inputs 514 into an electrical signal processed by a signal processor to generate a digital representation of audio input 514. Voice recognition interface 510 may provide for creating what-if scenarios (e.g. "increase margin," "range/de-range and reconcile"); searching for products (e.g. "top sellers," "bottom seller," and the like); filtering products (e.g. "brand," "attribute," and the like); and enabling actions (e.g. "increase return on sales," "create drops," and the like). According to embodiments, voice recognition interface 510 may recognize a user's voice commands to, for example, open a retail planning application, increase a margin for a particular assortment or for a particular plan by automatically increasing the margin to the user's previous or preferred setting, search for products, or limit the number of tactile input entries. In addition, or as an alternative, coordinated interaction system 110 utilizes user interface 520 to display to user 516 information related to or in response to audio inputs 514.

Figure 6:
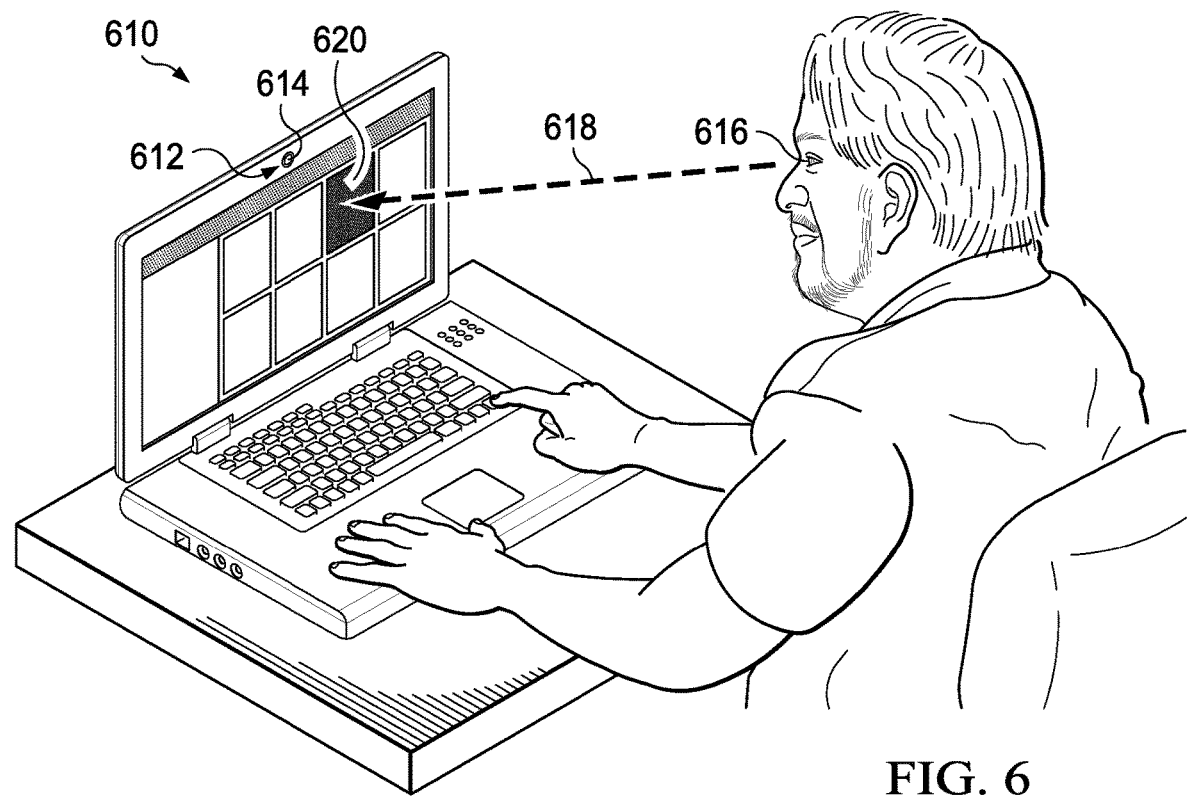
FIG. 6 illustrates the eye tracking and facial recognition interface of the coordinated interaction system, according to an embodiment.

FIG. 6 illustrates eye tracking and facial recognition interface 610 of coordinated interaction system 110, according to an embodiment. Eye tracking and facial recognition interface 610 may comprise imaging sensor 612, such as camera 614, which detects photons that are transformed by an imaging processor to generate a digital representation of an image. According to embodiments, imaging sensor 612 or camera 614 identifies the location, position, and or movement of a user's face and eyes 616 to identify and/or predict expressions, moods, user gaze 618, and the like. In addition, eye tracking provides for drilling down on products or information which coordinated interaction system 110 displays on user interface 620 to allow a user to view attributes, zoom in to plans for better visibility, and implement automatic and/or lazy scrolling of display information. According to embodiments, by monitoring user gaze 618 through the user's eye movements and/or positions, coordinated interaction system 110 identifies a product within user gaze 618 and evokes that object to drill down into products or attributes, zooming in on a particular plan for better visibility, and scrolling through lists automatically when detecting user gaze 618 is near the last displayed object on the list.

According to embodiments, facial recognition provides for automatically recognizing users, automatically logging users into applications or workstations, rendering applications based on permissions, authorization of the identified user, and remembering contextual information for applications and other settings. According to embodiments, coordinated interaction system 110 remembers a user's previous session and automatically loads the same session the next the user logs in.

Figure 7:
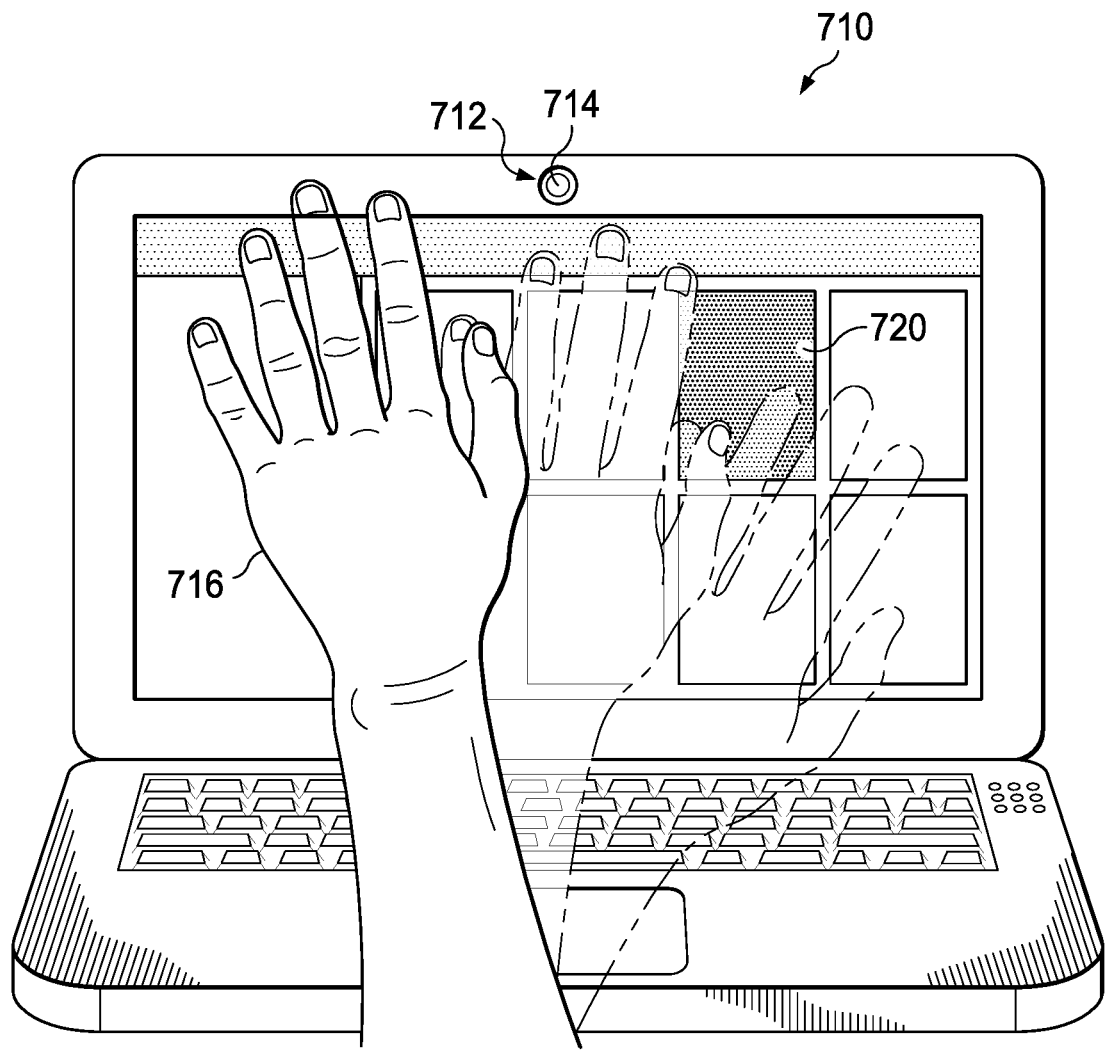
FIG. 7 illustrates the gesture control interface of the coordinated interaction system, according to an embodiment.

FIG. 7 illustrates gesture control interface 710 of coordinated interaction system 110, according to an embodiment. Gesture control interface 710 may comprise gesture image sensor 712, such as camera 714, which detects photons that are transformed by an imaging processor to generate a digital representation of an image. According to embodiments, camera 714 identifies the location, position, and or movements and gestures of user hand 716 to interpret a user's input commands. According to embodiments, such commands comprise drilling down on products to view attributes, zooming into plans for better visibility, and automatic and/or lazy scrolling of display information, although gesture control interface 710 may interpret other command permutations or instructions as per particular embodiment needs.

Gesture control interface 710 provides for simulating motions without directly touching an interface device to, for example, simulate tapping motions to open/close applications or windows and simulate single/double clicks to, for example, select/deselect objects, display menus, and the like. Although gesture control interface 710 is described comprising particular movements that initiate actions in gesture control interface 710, embodiments contemplate a gesture control that interprets any type of gesture to initiate, terminate, or modify any predetermined process of user interface 720.

In addition, and as described above, any one or more of the use cases described may coordinate and integrate any combination of one or more of voice recognition, eye tracking, facial recognition, and/or gesture recognition to initiate any one or more actions of user interface 720, such as minimizing or maximizing dialogue boxes or opening or closing menus. Embodiments contemplate calibrating the coordinated interaction system 110 to recognize differences between the voices, eye movements, facial features, and idiosyncrasies of gestures between different users. In addition, coordinated interaction system 110 comprises AI and/or machine learning to more accurately determine the proper actions to take (or not to take) based on monitoring by any combination of one or more of voice recognition, eye tracking, facial recognition, and/or gesture recognition and the temporally associated behavior or actions of the user. As coordinated interaction system 110 learns, it becomes more proficient at contextually rendering user interface 720 and displaying data, performing the appropriate actions, understanding and discriminating individual voices and sounds, and the like.

According to embodiments, coordinated interaction system 110 comprises a learning mechanism to adjust the behavior of the system based on the behavior of the user. For example, coordinated interaction system 110 comprises an initial rule set that determines the conditions required to initiate one or more actions. Coordinated interaction system 110 monitors a user's gaze and, in response to gazing at a product displayed in an assortment planning dashboard, coordinated interaction system 110 opens a product details window. However, if the user closes the opened window within a particular threshold (e.g. a predetermined number of seconds, such as, for example, two seconds), coordinated interaction system 110 records this action as a neutral or negative user response, but otherwise does not alter the response of coordinated interaction system 110 when a user gazes at a product. However, if the user again closes a window quickly after coordinated interaction system 110 opened it, coordinated interaction system 110 records that action as a negative response. After a predetermined number of negative responses, coordinated interaction system 110 may execute a different action in response to the user's gaze, or not execute an action at all. For example, coordinated interaction system 110 may monitor the actions taken directly after the user closes the windows. If the action taken after closing the window appears to be the action that the user would prefer in response to gazing a particular product, coordinated interaction system 110 may learn and execute that alternative action. In addition, or in the alternative, if the user terminates gazing at a particular product, the system may automatically close a window based, at least in part, on learned actions. However, if the user terminates gazing at a particular product while contemporaneously providing voice instructions to search for a product, coordinated interaction system 110 may initiate a search for the gazed product, instead of the closing the window based on the additional input (voice command) that is coordinated and integrated with other inputs (gaze, lack of tactile input, body position, or the like).

By way of a further example using gaze as a user input, coordinated interaction system 110 may initially interpret a user turning his or her head away from the screen as indicating disinterest in the displayed products and, accordingly, initiate some action, such as, for example, returning to a home screen, closing a currently opened product, or the like. However, the user may turn his or her head away for other reasons, such as, for example, using a calculator. Therefore, coordinated interaction system 110 may interpret the user turning his or her head a first time to indicate disinterest, but as soon as the user turns back toward the screen and opens the program or window that was closed, coordinated interaction system 110 may identify that the user's gaze turning away from the screen does not show disinterest under those conditions. Accordingly, coordinated interaction system 110 may continually monitor and evaluate a user's actions in response to actions taken by the system. Over time, the system's actions become closely coordinated with the user's actions.

According to embodiments, coordinated interaction system 110 stores the user's profile in a cloud-based storage solution to allow interpretation of the user's actions in response to the actions of coordinated interaction system 110 regardless of the particular application or location. Coordinated interaction system 110 creates a customization profile specific to each user and which may be launched automatically when coordinated interaction system 110 detects a particular user and closed automatically when coordinated interaction system 110 detects the user is no longer using the system. For example, as soon as coordinated interaction system 110 recognizes a particular user's face, coordinated interaction system 110 launches that user's profile and any customer-specific data associated with the user. According to embodiments, coordinated interaction system 110 logs the user's actions and the context under which the user's actions occurred. Coordinated interaction system 110 may analyze the log, alone or in connection with the logs of one or more other users, using AI algorithms to more accurately predict the appropriate actions to execute.

According to embodiments, coordinated interaction system 110 utilizes AI algorithms to analyze the various inputs, coordinate the various inputs, filter data received form the various inputs, and determine the appropriate action to take based on the combination of inputs, the data received, any data modifications, and the context of the program when the inputs arose.

For example, if a user talks to coordinated interaction system 110 in a situation in which excessive background noise is present, coordinated interaction system 110 recognizes the user's voice and filter out the background noise. In addition, if two users are speaking near the system, coordinated interaction system 110 selectively filters the audio to respond to the voice commands of a predetermined user (such as, for example, a user who was previously directly interacting with coordinated interaction system 110).

Providing integrated gesture control delivers significant productivity gains as the users may manipulate the software in multiple ways and coordinated interaction system 110 automatically and intelligently responds to users based on their actions and gestures simultaneously and seamlessly.

By way of example only and not by way of limitation, assortment planner 120 plans products for men's shirts for an upcoming shopping season. When using assortment planner 120, one or more sensing devices 140 associated with assortment planner 120 permit coordinated interaction system 110 to identify the user automatically, log the user into assortment planning application, and contextually render the user interface, data, and displayed graphic elements based on, for example, permissions, security, geography, role, personal preferences, and the like. Coordinated interaction system 110 thereby identifies a user and renders an individually-customized instance of assortment planning software.

Reference in the foregoing specification to "one embodiment," "an embodiment," or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for assortment planning for products, comprising an assortment planner communicatively coupled to an inventory system over a network, the assortment planner further comprising:

a computer coupled with a database and comprising a processor and memory, the computer configured to:

monitor two or more modes of user inputs using one or more sensors and one or more tactile interface devices;

detect at least two modes of user input and store the at least two modes of user inputs in the database;

evaluate the stored user inputs in the database and the at least two modes of user input by deriving an inference based on determining whether a multinomial model or a Bernoulli model provides a better predictive model of the stored user inputs and based on applying a singular threshold duration to a mode of the at least two modes of user input;
predict a system action based on the derived inference, wherein the system action is directed to assortment planning;
generate the system action based on the prediction derived from the inference and the one or more stored user inputs;
monitor user input in response to the generated system action;
execute the user input instead of the generated system action based on a prioritization;
evaluate the monitored user input to adjust the predictive model based at least in part on a number of negative responses to the generated system action;
generate a product assortment by indicating the products that will be included or excluded in the product assortment for a particular planning period based on data regarding sales, profitability, transferable demand or similarity, for any one or more products or assortments; and
calculate a purchase quantity of items in the product assortment and place an order based on the product assortment.

2. The system of claim 1, wherein the computer is further configured to:
track a user's identity throughout subsequent user interactions;
detect an additional user input;
store the additional user input in the database;
evaluate the stored additional user input in the database and the at least two modes of user input to generate a subsequent system action tailored to the identified user; and
generate a subsequent system action based on predicting a user action and the user's determined identity.

3. The system of claim 2, wherein the computer is further configured to identify, track, and generate system actions for multiple users simultaneously.

4. The system of claim 1, wherein the system action comprises one or more of generating a personalized application, opening a workspace, and rendering data for display.

5. The system of claim 1, wherein the one or more sensors comprise one or more of an imaging sensor, a radio receiver, and a microphone.

6. The system of claim 1, wherein the user input comprises one or more of keyboard input, mouse input, touch input, voice input, gestures, and eye movement.

7. A computer-implemented method for assortment planning for products, comprising:
providing a system comprising an assortment planner communicatively coupled to an inventory system over a network, wherein the assortment planner comprises a database and a computer, the computer comprising a processor and memory;
monitoring, using one or more sensors and one or more tactile interface devices, two or more modes of user inputs to the system;
detecting at least two modes of user input and storing the at least two modes of user inputs in the database;
evaluating the stored user inputs in the database and the at least two modes of user input by deriving an inference based on determining whether a multinomial model or a Bernoulli model provides a better predictive model of the stored user inputs and based on applying a singular threshold duration to a mode of the at least two modes of user input;
predicting a system action based on the derived inference, wherein the system action is directed to assortment planning;
generating the system action based on the prediction derived from the inference and the one or more stored user inputs;
monitoring user input in response to the generated system action;
executing the user input instead of the generated system action based on a prioritization;
evaluating the monitored user input to adjust the predictive model based at least in part on a number of negative responses to the generated system action;
generating a product assortment by indicating the products that will be included or excluded in the product assortment for a particular planning period based on data regarding sales, profitability, transferable demand or similarity, for any one or more products or assortments; and
calculating a purchase quantity of items in the product assortment and placing an order based on the product assortment.

8. The computer-implemented method of claim 7, further comprising:
tracking a user's identity throughout subsequent user interactions;
detecting an additional user input;
storing the additional user input in the database;
evaluating the stored additional user input in the database and the at least two modes of user input to generate a subsequent system action tailored to the identified user; and
generating a subsequent system action based on predicting a user action and the user's determined identity.

9. The computer-implemented method of claim 8, further comprising:
identifying, tracking, and generating system actions for multiple users simultaneously.

10. The computer-implemented method of claim 7, wherein the system action comprises one or more of generating a personalized application, opening a workspace, and rendering data for display.

11. The computer-implemented method of claim 7, wherein the one or more sensors comprise one or more of an imaging sensor, a radio receiver, and a microphone.

12. The computer-implemented method of claim 7, wherein the user input comprises on or more of keyboard input, mouse input, touch input, voice input, gestures, and eye movement.

13. A non-transitory computer-readable storage medium embodied with software for assortment planning for products, the software when executed configured to:
monitor, using one or more sensors and one or more tactile interface devices, two or more modes of user inputs to a system, the system comprising an assortment planner communicatively coupled to an inventory system over a network, wherein the assortment planner comprises a database and a computer, the computer comprising a processor and memory;
detect at least two modes of user input and store the at least two modes of user inputs in the database;
evaluate the stored user inputs in the database and the at least two modes of user input by deriving an inference based on determining whether a multinomial model or a Bernoulli model provides a better predictive model of the stored user inputs and based on applying a singular threshold duration to a mode of the at least two modes of user input;
predict a system action based on the derived inference, wherein the system action is directed to assortment planning;
generate the system action based on the prediction derived from the inference and the one or more stored user inputs;
monitor user input in response to the generated system action; execute the user input instead of the generated system action based on a prioritization;
evaluate the monitored user input to adjust the predictive model based at least in part on a number of negative responses to the generated system action;
generate a product assortment by indicating the products that will be included or excluded in the product assortment for a particular planning period based on data regarding sales, profitability, transferable demand or similarity, for any one or more products or assortments; and
calculate a purchase quantity of items in the product assortment and place an order based on the product assortment.

14. The non-transitory computer-readable storage medium of claim 13, wherein the software is further configured to:
track a user's identity throughout subsequent user interactions;
detect an additional user input;
store the additional user input in the database;
evaluate the stored additional user input in the database and the at least two modes of user input to generate a subsequent system action tailored to the identified user; and
generate a subsequent system action based on predicting a user action and the user's determined identity.

15. The non-transitory computer-readable storage medium of claim 14, wherein the software is further configured to identify, track, and generate system actions for multiple users simultaneously.

16. The non-transitory computer-readable storage medium of claim 13, wherein the system action comprises one or more of generating a personalized application, opening a workspace, and rendering data for display.

17. The non-transitory computer-readable storage medium of claim 15, wherein the one or more sensors comprise one or more of an imaging sensor, a radio receiver, and a microphone.

18. The non-transitory computer-readable storage medium of claim 13, wherein the user input comprises on or more of keyboard input, mouse input, touch input, voice input, gestures, and eye movement.

* * * * *